US006886227B1

(12) United States Patent
Hedrick

(10) Patent No.: US 6,886,227 B1
(45) Date of Patent: May 3, 2005

(54) LOW IMPACT SHAFT REMOVER

(76) Inventor: Terry L. Hedrick, 3675 Old Braswell Rd., Monroe, GA (US) 30656

( * ) Notice: Subject to any disclaimer, the term of this patent is extended or adjusted under 35 U.S.C. 154(b) by 214 days.

(21) Appl. No.: 10/388,119

(22) Filed: Mar. 13, 2003

(51) Int. Cl.[7] .................................................. B23P 19/04
(52) U.S. Cl. ............................ 29/252; 29/255; 29/263
(58) Field of Search .......................... 29/252, 263, 255, 29/280, 282; 269/3, 6

(56) References Cited

U.S. PATENT DOCUMENTS

| | | | |
|---|---|---|---|
| 2,770,507 A | 11/1956 | Ehnts | |
| 2,953,846 A | 9/1960 | Wagner | |
| 2,971,254 A | 2/1961 | Fairfield | |
| 3,748,718 A | 7/1973 | Russell | |
| 4,000,556 A * | 1/1977 | Ciminero | 29/890.031 |
| 4,129,931 A | 12/1978 | Carrigan | |
| 4,451,964 A | 6/1984 | Ludwig | |
| 4,451,978 A | 6/1984 | Ludwig | |
| 4,636,007 A | 1/1987 | Persons | |
| 4,682,395 A | 7/1987 | Klann | |
| 4,936,003 A | 6/1990 | Gloe | |
| 4,965,921 A | 10/1990 | Priest | |
| 5,232,069 A | 8/1993 | Siegrist | |
| 5,261,149 A | 11/1993 | Sutton | |
| 5,896,639 A | 4/1999 | Chen | |
| 6,186,278 B1 | 2/2001 | Borling | |
| 6,223,410 B1 | 5/2001 | Sroka | |
| 6,266,861 B1 | 7/2001 | Chen | |

* cited by examiner

*Primary Examiner*—Lee D. Wilson
(74) *Attorney, Agent, or Firm*—Hinkle & O'Bradovich, LLC

(57) ABSTRACT

A low impact shaft remover apparatus that aids in the removal of a shaft attachment that has become stuck to a shaft is described. In general, the apparatus includes a main body having an open end, a hollow interior and an internal conduit located within a portion of the main body. A valve is connected to the main body and coupled to the conduit. A leading edge of the main body includes an angled wall that aids in the formation of a reservoir formed when the leading edge is connected to a surface of the shaft attachment such as a hub. A suitable lubricating fluid is inserted into the valve, through the conduit and ultimately stored in the reservoir generally around the circumference of the shaft. Pressure is then applied to the valve which pushes the fluid into any available spaces between the attachment and the shaft.

18 Claims, 6 Drawing Sheets

LOW IMPACT SHAFT REMOVER

BACKGROUND OF THE INVENTION

I. Field of the Invention

The present invention relates generally to the field of shafts and shaft attachments and more particularly to systems and methods for removing various types of shaft attachments that have become stuck to the respective shaft.

II. Description of the Related Art.

In various fields of practice involving any type of shaft that has a shaft attachment around the shaft, the respective shaft can become rusted, frozen or otherwise stuck within the attachment. In many instances, the shaft can be struck with an instrument such as a hammer to remove the shaft from the attachment. In other instances, the entire shaft-attachment unit can be discarded. However, in many fields, it is not desirable to strike the shaft or to throw away the entire unit. For example, in the automotive field, many vehicles have constant velocity joints (CV joints) in the wheel hub. The CV joints typically include an outer CV axle joint having a spline shaft. The spline shaft is held within the wheel hub that has a series of elongated notches to receive the splines of the shaft. Due to normal use, CV joints wear out and must be replaced. Over a period of time, the spine shaft of the CV joint becomes frozen within the hub attachment, typically from the prolonged exposure to moisture and road grit. In most practices, the shaft must be struck with a hammer to remove the shaft from the hub.

SUMMARY OF THE INVENTION

In general, the invention features a low impact shaft remover system, apparatus and method that forces a penetrant, oil or other lubricating fluid around a stuck shaft and hub (or other system involving a stuck shaft and attachment) in order to ease removal of the shaft. The basic embodiments involve to store the lubricating fluid in a reservoir equally around the circumference of the stuck shaft. Air pressure is then supplied, the fluid stored in the reservoir is forced between the shaft and its attachment.

In general, in one aspect, the invention features a shaft remover apparatus, including a main body having an open end having a leading edge, a second end and a hollow interior, a conduit located within a portion of the main body, an input valve connected to the main body and coupled to the conduit, an inner wall angled from the leading edge toward the hollow interior, wherein the conduit opens on the inner wall and threads located on a portion of the open end.

In one implementation, the second end is closed.

In another implementation, the second end is open.

In another implementation, the apparatus includes a seal connected to the leading edge.

In another implementation, the main body has a cylindrical cross section.

In another implementation, the main body has a hexagonal cross section.

In another aspect, the invention features a system for removing a shaft from a shaft attachment, including a shaft remover apparatus, including a main body having an open end having a leading edge, a second end and a hollow interior, a conduit located within a portion of the main body, an input valve connected to the main body and coupled to the conduit and an inner wall angled from the leading edge toward the hollow interior, wherein the conduit opens on the inner wall and means to connect the shaft remover apparatus to the attachment.

In one implementation, the attachment is a hub and the shaft is a constant velocity joint shaft.

In another implementation, the second end is closed and the means to connect the shaft remover apparatus to the hub is a hub puller.

In another implementation, the second end is open and the means to connect the shaft remover apparatus to the hub is a shaft nut.

In another aspect, the invention features a system for removing a shaft from a shaft attachment, including an inner body having a first open end having a leading edge, a second open end, a hollow interior, inner threads located on an internal surface of the inner body and outer threads located on an external surface of the inner body, an outer body having a first open end, a second end, a hollow interior and inner threads located on an internal surface of the outer body, wherein the outer threads of the inner body are in threaded engagement with the inner threads of the outer body, an inner chamber including the second open end of the inner body, the first open end of the outer body and the hollow interior of the outer body, an input valve connected to the outer body, an inner conduit located within the outer body, connected to the input valve and coupled to the chamber, a conduit located within the inner body, the conduits being coupled to the chamber and an inner wall angled from the leading edge toward the hollow interior, wherein the inner body conduit opens on the inner wall.

In one implementation, the second end is open.

In another implementation, the system further includes a piston located within the chamber, a spring in mechanical contact with the piston and a threaded bolt in threaded engagement with the second open end and in mechanical contact with the piston.

In yet another aspect, the invention features a system for removing a shaft attachment from a shaft, including a main body having an open end having a leading edge in mechanical contact with a surface of the attachment, thereby forming a reservoir, a second end and a hollow interior, a conduit located within a portion of the main body, an input valve connected to the main body and coupled to the conduit and an inner wall angled from the leading edge toward the hollow interior, wherein the conduit opens on the inner wall.

In one implementation, the system further includes inner threads on an internal surface of the main body, the inner threads being in threaded engagement with threads on the shaft.

In another implementation, the system further includes a shaft remover connector connected to the main body and to the attachment.

In still another aspect, the invention features a shaft remover apparatus, including a main body having an open end and a conduit within a portion of the main body, an input valve connected to the main body and coupled to the conduit and means to form a reservoir adjacent a leading edge of the main body, wherein the conduit opens into the reservoir.

In one implementation, the reservoir is formed by a recessed portion of the open end.

One advantage of the invention is that lubricating fluid can be easily added and penetrated into available space between a shaft and its attachment.

Another advantage of the invention is that a shaft attachment can be removed from a shaft with low impact.

Another advantage is collected rust, dirt grit and debris is removed by the penetrating fluid.

Other objects, advantages and capabilities of the invention will become apparent from the following description taken in conjunction with the accompanying drawings showing the preferred embodiment of the invention.

DETAILED DESCRIPTION

The embodiments described herein are specific to a CV joint and hub system for illustrative purposes. As described further below, the embodiments of the low impact shaft remover can be used in many fields having shafts that have become stuck within a shaft attachment.

Low Impact Shaft Remover Apparatus

Figure 1:
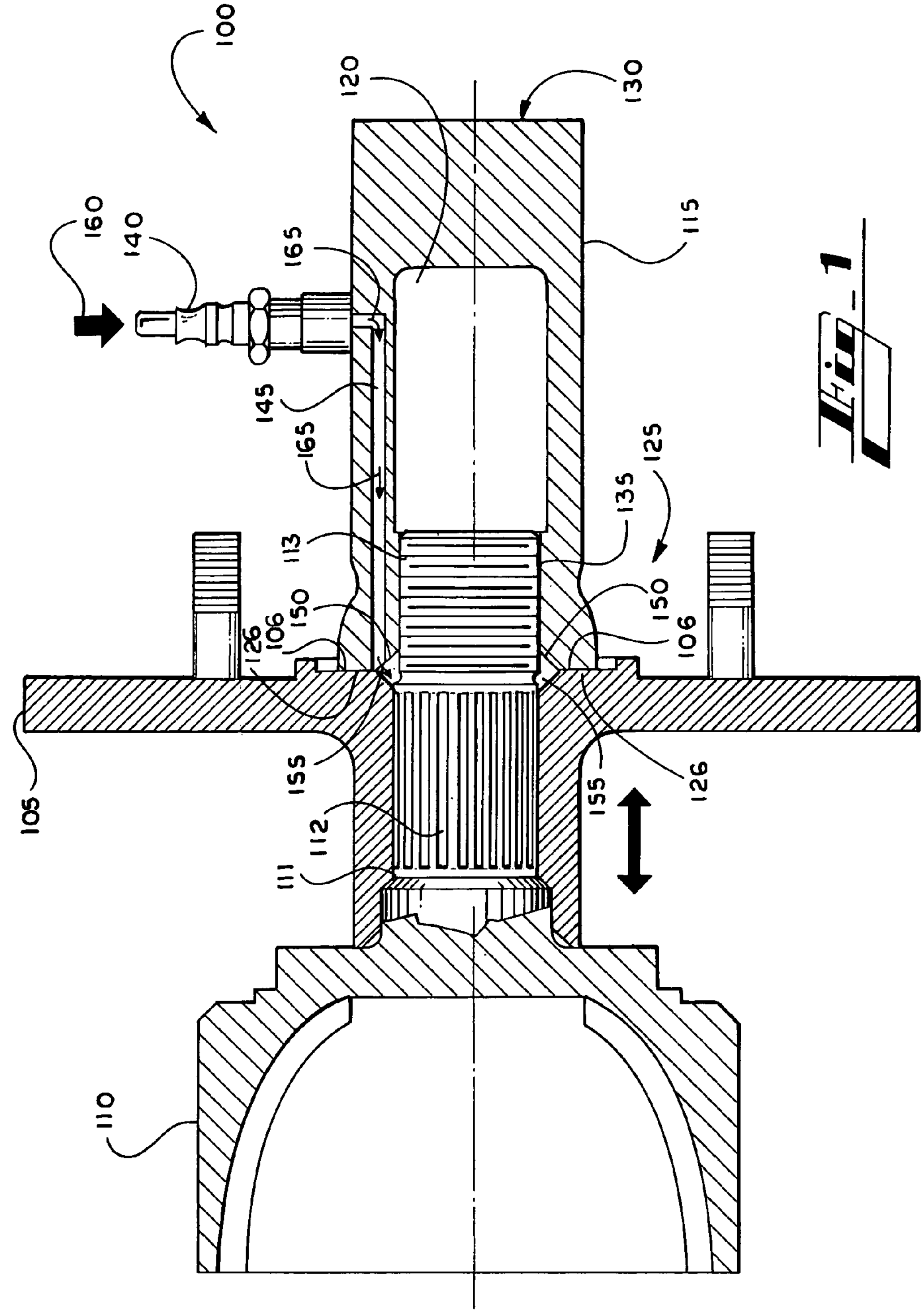
FIG. 1 illustrates an embodiment of a low impact shaft remover connected to a shaft of an outer CV joint.

Referring to the drawings wherein like reference numerals designate corresponding parts throughout the several figures, reference is made first to FIG. 1 that illustrates an embodiment of a low impact shaft remover 100 ("shaft remover") connected to a shaft 111 of an outer CV joint 110. The shaft 111 is typically cylindrical and generally includes a splined portion 112 and a threaded portion 113 along a circumference of the shaft 111. As described above, the splined portion 112 can become stuck within a hub 105 of a wheel.

The shaft remover 100 generally includes a main body 115 having a hollow interior 120. The main body 115 can have a variety of cross sectional shapes. Since the hub 105, shaft 111 and CV joint 110 are also typically circular, the main body 115 typically has a circular cross section. However, as described in further embodiments below, the main body 115 can have other cross sections such as hexagonal. It is understood that there is no limitation to the type of cross section that the main body 115 can have.

The main body 115 also includes an open end 125 and closed end 130. In other embodiments, both ends of the main body 115 can be open so that the hollow interior 120 runs the length of the main body 115. The open end 125 generally includes a threaded portion 135 adapted to be in threaded engagement with the threaded portion 113 of the shaft 111. During normal operation, the shaft 111 typically includes a nut (not shown) to keep the hub 105 affixed to the CV joint 110. As shown in FIG. 1 the threaded portions 113, 135 are in threaded engagement. The hollow interior 120 is adapted to receive the threaded portion 113 of the shaft 111 as the shaft remover 100 is connected to the shaft 111.

The shaft remover 100 can further include a valve input 140 that is adapted to receive both liquids and gases. The input valve 140 is connected to the main body 115. The input valve 140 is coupled to an internal conduit 145 that runs a portion of the main body 115. The internal conduit 145 opens adjacent the open end 125 of the main body 115. The open end 125 generally includes an inner wall 150 running an inner perimeter of the open end 125. In one embodiment, the inner wall 150 is generally angled inward of the open end 125 toward the interior 120 forming a recessed portion or chamfered profile. In other embodiments, the inner wall and the formed recessed portion can have any suitable profile or contour such as a rectangular or circular cross section. It is understood that any profile is typically suitable. When the shaft remover 100 is connected to the shaft 111, a leading edge 126 of the open end 125 come into contact with a surface 106 of the hub 105, generally forming a seal between the surface 106 and the leading edge 126. In another embodiment, an o-ring or other suitable seal can be added to the leading edge 126 to create a better seal.

When the shaft remover 100 is connected to the shaft 111, a reservoir 155 is formed between the hub 105 and the shaft remover 100. The reservoir 155 is generally formed due to the profile of the inner wall 150. With the wall 150 being angled, the reservoir 155 is generally chamfered. However, as described above, other suitable profiles can be used.

Low Impact Shaft Remover Operation

With the shaft remover 100 connected to the shaft 111, a suitable fluid can be inserted into the input valve 140 as shown generally by arrow 160. The fluid generally flows through the input valve 140 into and through the internal conduit 145 along arrows 165, and ultimately into the reservoir 155. The reservoir 155 having received the fluid stores the fluid generally equally around the exposed circumference of the shaft 111. Typically, although the hub 105 is generally stuck around the shaft 111, there typically exists some space or channels between the shaft 111 and the hub 105. The fluid, stored in the reservoir 155 can move through these available spaces between the shaft 111 and the hub 105. However, to increase the efficiency of the penetration of the fluid between the shaft 111 and the hub 105, gas pressure can be added to the input valve 140, also in the direction of arrow 160. In a typically implementation, air pressure is added although it is understood that any typical gas can be used such as nitrogen and the like. The compressed gas can be applied by any suitable method such as, but not limited to, a tire pump, Schrader valve, air hose coupler, blow gun, nozzle and the like. In another implementation, the fluid can be pressurized directly into the input valve 140 with a pressurized fluid attachment. With pressure added, fluid is forced through any of the existing passages that may exist between the shaft 111 and the hub 105. This penetration of the fluid can dissolve any rust and reduce friction that exists between the shaft 111 and hub 105. When it is determined that sufficient fluid has pushed between the shaft 111 and the hub 105, pressure can be removed and the shaft remover 100 can be removed, and the hub 105 can be attempted to be removed from the shaft 111. If the shaft 111 and the hub 105 are still stuck, the steps discussed above can be repeated as needed.

Figure 2:
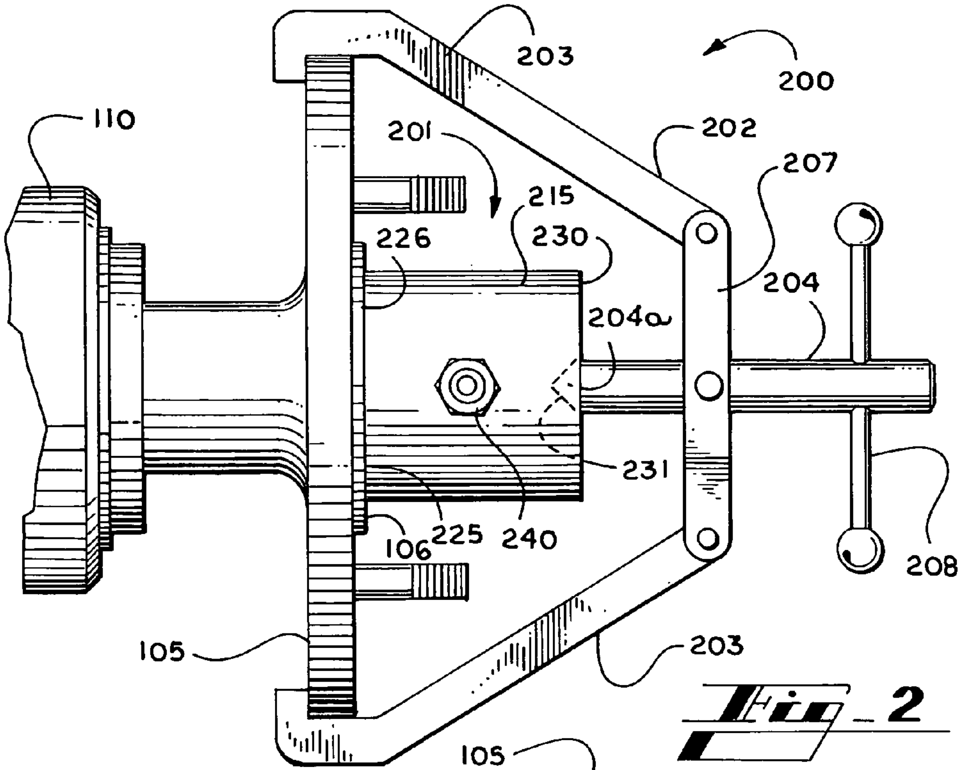
FIG. 2 illustrates an embodiment of a low impact shaft remover system including an embodiment of a shaft remover apparatus held to a wheel hub using a conventional hub puller.

FIG. 2 illustrates an embodiment of a low impact shaft remover system 200 including an embodiment of a shaft remover apparatus 201 ("shaft remover") held to a wheel hub using a conventional hub puller 202. The shaft remover 201 generally includes the same components as described in the embodiment of FIG. 1. That is, the shaft remover 201 includes a main body 215 (having a hollow interior similar to FIG. 1 hollow interior 120), an open end 225, a closed end 230, a leading edge 226 and a valve input 140. An internal conduit similar to the internal conduit described above (see FIG. 1, internal conduit 145), is coupled to the valve input and ultimately to a reservoir similar to the reservoir described above (see FIG. 1, reservoir 155 formed by the profile of the inner wall 150) that is formed by an inner wall in the main body 205 and a surface 106 of the hub. An o-ring seal or other suitable seal (not shown) can be included to form a better seal between the leading edge 226 and the surface 106 to keep fluid within the reservoir.

The embodiment of the shaft remover 201 generally differs from the embodiment described above because the main body 215 does not include a threaded portion. Instead, the open end 225 can be placed over the shaft 111 that enters the hollow interior of the main body 215. The hub puller 202 can be placed as it would in its normal use, except that the shaft remover 201 is placed over the shaft 111. A conventional shaft puller includes jaws 203 that are placed over the outer edges of the hub 105. The fingers are attached to a central body 207. A threaded shaft 204 having a conical tip 204*a* is in threaded engagement with the central body 207. The conical tip 204*a* is placed within a conical recess 231 located on the closed end 230 of the main body 215. By twisting the threaded shaft 204 with a cross bar 208, the shaft remover 201 is pressed against the surface 106 of the hub 105. Normally, the hub puller 202 would pull the hub 105 from the shaft 111. However, in a situation in which the shaft 111 and the hub 105 are stuck together, the hub 105 typically stays in place. This action secures the shaft remover 201 against the hub 105. With this orientation, the suitable lubricating fluid can be added to the input valve 240 and ultimately to the reservoir. Pressure can then be added to the input valve 240 to push the fluid between any available spaces between the shaft 111 and the hub 105 as described above.

The system 200 can be combined as a shaft remover kit that includes the shaft remover 201 and the hub puller 202. It is understood that there are many commercially available hub pullers that can be used in lieu of the hub puller 202 described herein.

A more detailed view of the shaft remover 201 is discussed in the description below with respect to FIGS. 6 and 7.

Figure 3:
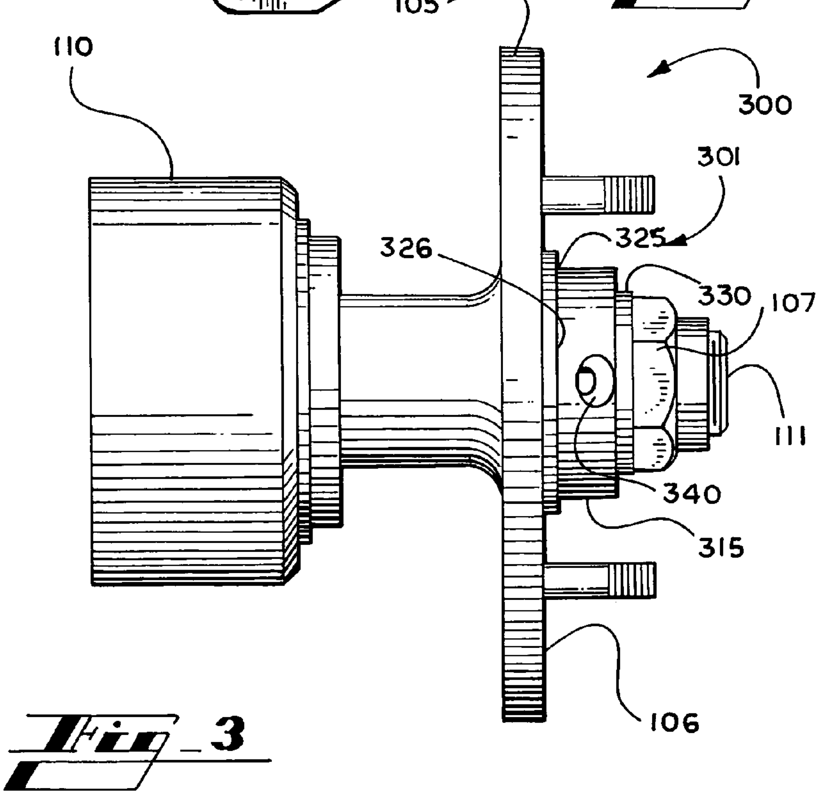
FIG. 3 illustrates another embodiment of a low impact shaft remover system connected to a shaft of a CV joint.

FIG. 3 illustrates another embodiment of a low impact shaft remover system 300 connected to a shaft 111 of a CV joint 110. The system includes an embodiment of a shaft remover 301 and a nut 107 originally taken off the shaft 111. Similar to the embodiments described above, the shaft remover 301 generally includes a main body 315 having a hollow interior, a first open end 325 having a leading edge 326 and a second open end 330. In this embodiment, the main body 315 as well as the hollow interior are greatly shortened so that a portion of the shaft 111 protrudes from the second open end 330. The shaft remover 301 includes an input valve 340 with an internal conduit, which is also greatly shortened compared to the embodiments described above. The embodiments described above generally illustrates the internal conduit as taking a "L" shape. In the shortened shaft remover 301, the conduit runs a generally straight line from the input valve 340 to the reservoir as is described in further detail in the discussion below.

The shaft remover 301 is shortened so that the existing nut 107 can be used to secure the shaft remover 301 on the shaft 111. Once the shaft remover 301 is placed on the shaft 111, the nut 107 can be tightened so that the leading edge 326 can press against the surface 106 of the hub, thereby forming a reservoir (due to the inner wall profile) similar to the reservoirs described in the embodiments above. An o-ring seal or other suitable seal (not shown) can be included to form a better seal between the leading edge 326 and the surface 106 to keep fluid within the reservoir.

Once the system 300 is placed, lubricating fluid can be inserted in the input valve 340, that ultimately ends up in the reservoir. Pressure can then be applied to the input valve 340 as described above to push the fluid through available spaces between the shaft 111 and the hub 105 as described above.

A more detailed view of the shaft remover 301 is discussed in the description below with respect to FIGS. 8 and 9.

Figure 4:
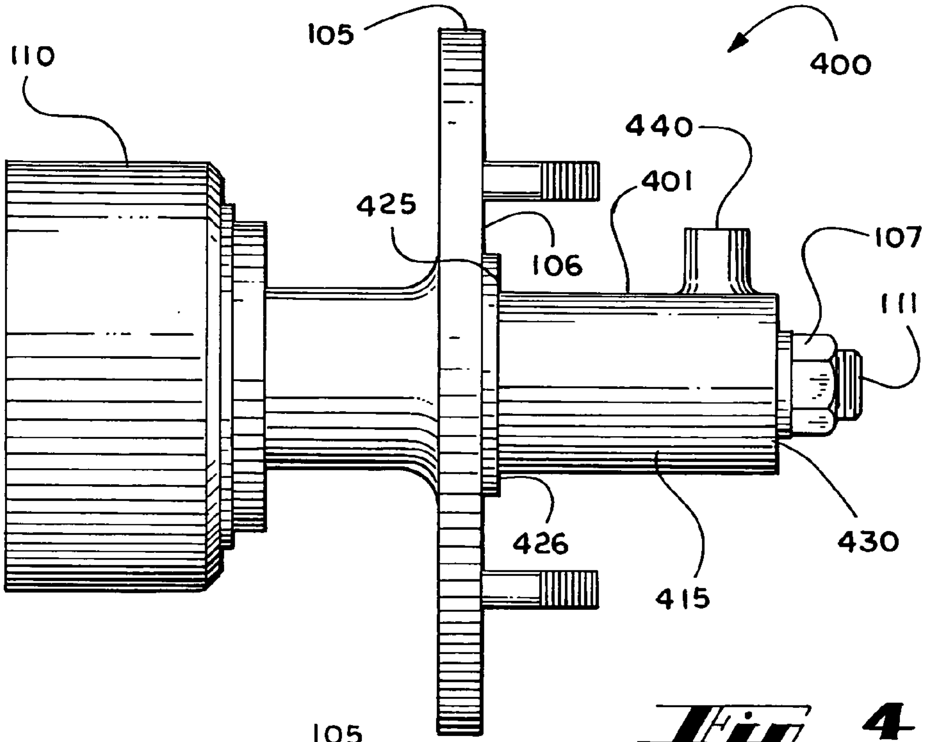
FIG. 4 illustrates another embodiment of a low impact shaft remover connected to a shaft of a CV joint.

FIG. 4 illustrates another embodiment of a low impact shaft remover system 400 connected to a shaft 111 of a CV joint 110. The system includes 400 an embodiment of a shaft remover 401 and a nut 107 originally taken off the shaft 111. Similar to the embodiments described above, the shaft remover 401 generally includes a main body 415 having a hollow interior, a first open end 425 having a leading edge 426 and a second open end 430. In this embodiment, the main body 315 as well as the hollow interior are somewhat shortened as compared with the embodiment described with respect to FIG. 1 so that a portion of the shaft 111 still protrudes from the second open end 430, but longer than the embodiment as described with respect to FIG. 3. The shaft remover 401 includes an input valve 440 with an internal conduit. As mentioned above, the shaft remover 401 is shortened so that the existing nut 107 can be used to secure the shaft remover 401 on the shaft 111. Once the shaft remover 401 is placed on the shaft 111, the nut 107 can be tightened so that the leading edge 426 can press against the surface 106 of the hub, thereby forming a reservoir (due to the inner wall profile) similar to the reservoirs described in the embodiments above. An o-ring seal or other suitable seal (not shown) can be included to form a better seal between the leading edge 426 and the surface 106 to keep fluid within the reservoir.

Once the system 400 is placed, lubricating fluid can be inserted in the input valve 440, that ultimately ends up in the reservoir. Pressure can then be applied to the input valve 440 as described above to push the fluid through available spaces between the shaft 111 and the hub 105 as described above.

A more detailed view of the shaft remover 401 is discussed in the description below with respect to FIGS. 10 and 11.

Figure 5:
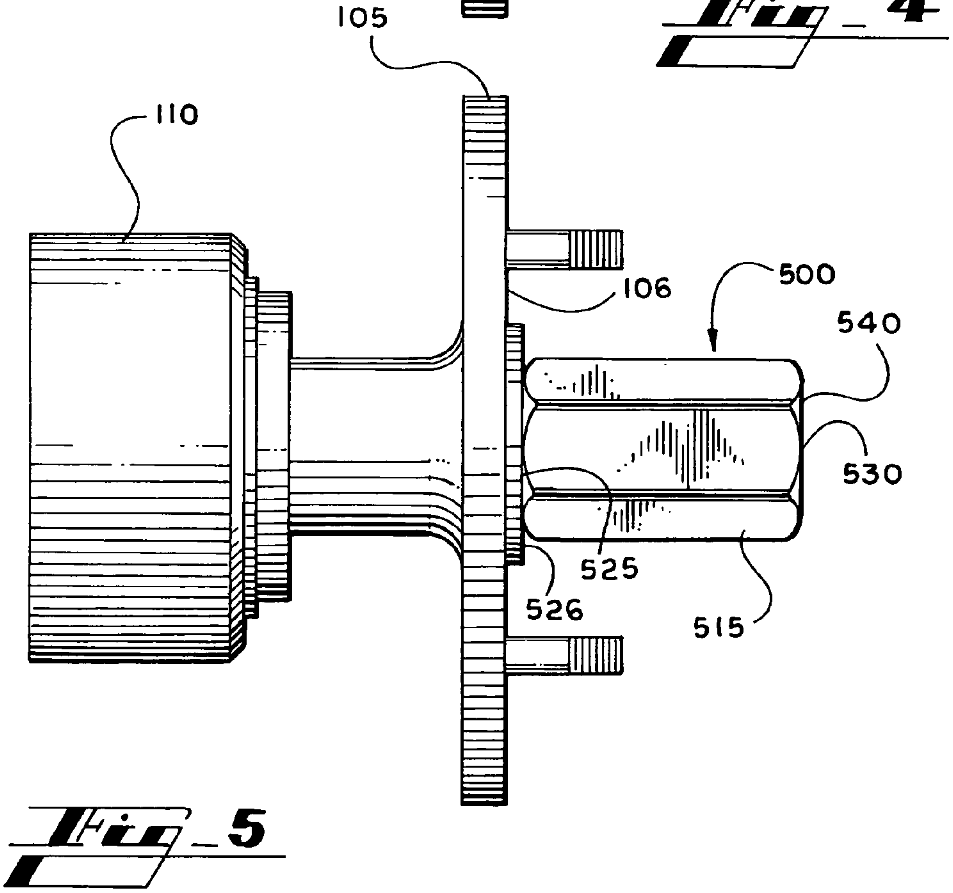
FIG. 5 illustrates another embodiment of a low impact shaft remover connected to a shaft of a CV joint.

FIG. 5 illustrates another embodiment of a low impact shaft remover 500 connected to a shaft 111 of a CV joint 110. Similar to the embodiments described above, the shaft remover 500 generally includes a main body 515 having a hollow. The description above mentioned that the main body can have a variety of cross-sectional shapes. The main body 515 has a generally hexagonal shape that mimics the shape and profile of the nut 107 described above so that a similar tool used to affix and remove the nut 107 can be used to affix and remove the shaft remover 500.

The main body 515 can include an open end 525 to receive the shaft 111 as described above. The main body 515 can also include a second open end 530 (that can also be closed). The open end 525 generally includes a threaded portion adapted to be in threaded engagement with the threaded portion 113 of the shaft 111. The threaded portion can run the entire length of the main body 515.

The shaft remover 500 further includes a valve input 540 similar to the embodiments described above. However, the valve 540 is located adjacent the open end 530. Furthermore, instead of an "L" shaped conduit or a shortened conduit, this conduit runs straight through the main body 515 generally parallel to the main body 515.

A more detailed view of the shaft remover 500 is discussed in the description below with respect to FIGS. 12 and 13. The shaft remover 500 further includes a profiled inner wall that forms a reservoir when the leading edge 526 of the open end 525 comes into contact with the surface 106 of the hub 105, generally forming a seal between the surface 106 and the leading edge 526. In another embodiment, an o-ring or other suitable seal can be added to the leading edge 526 to create a better seal.

In FIGS. 2–5 above, internal views of the different shaft remover embodiments are discussed mentioning detail that is not shown. The following figures illustrates further detail of the embodiments described in FIGS. 2–5.

Figure 6:
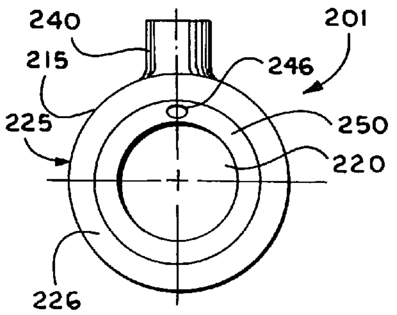
FIG. 6 illustrates a front view of the embodiment of a low impact shaft remover as shown in FIG. 2.

FIG. 6 illustrates a front view of the embodiment of a low impact shaft remover 201 as shown in FIG. 2. The shaft remover 201 includes the main body 215, having an open end 225 and a leading edge 226, and the input valve 240 attached to the main body 215. The shaft remover 201 also includes a hollow interior 220 and an inner wall 250 that is used to form the reservoir as described above. An opening 246 to the conduit is also shown.

Figure 7:
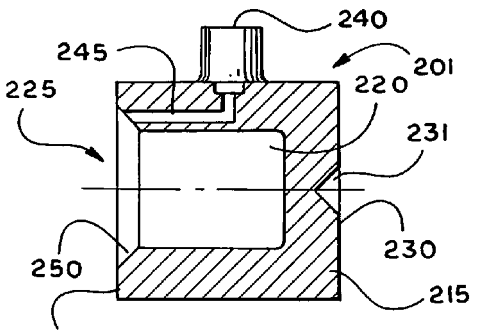
FIG. 7 illustrates a side view of the low impact shaft remover of FIG. 6.

FIG. 7 illustrates a side view of the low impact shaft remover 201 of FIG. 6. The shaft remover 201 includes the main body 215, having an open end 225, a closed end 230 and a leading edge 226, and the input valve 240 attached to the main body 215. An internal conduit 245 is connected to the input valve that is ultimately coupled to the reservoir formed partly by the inner wall 250. The shaft remover 201 also includes a hollow interior 220. The main body 215 also includes the conical recess 231 on the closed end 230 to receive the leading conical edge **204*a* of the hub remover 202 described above with respect to FIG. 2**. It is understood that the recess can have other profiles and cross sections other than conical to accommodate other types of hub pullers.

Figure 8:
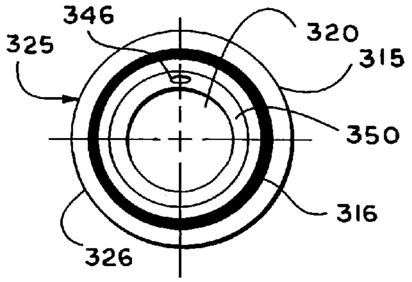
FIG. 8 illustrates a front view of the embodiment of a low impact shaft remover as shown in FIG. 3.

FIG. 8 illustrates a front view of the embodiment of a low impact shaft remover 301 as shown in FIG. 3. The shaft remover 301 includes the main body 315, having a first open end 325 and a leading edge 326. The input valve is not shown in this view. The shaft remover 301 also includes a hollow interior 320 and an inner wall 350 that is used to form the reservoir as described above. An opening 346 to the conduit is also shown. The leading edge 325 further includes an optional o-ring seal 316 as described above.

Figure 9:
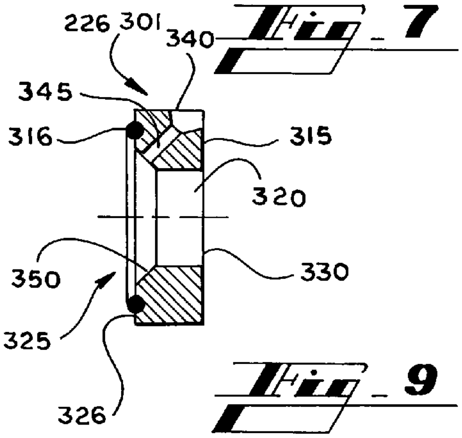
FIG. 9 illustrates a side view of the low impact shaft remover of FIG. 8.

FIG. 9 illustrates a side view of the low impact shaft remover 301 of FIG. 8. The shaft remover 301 includes the main body 315, having a first open end 325, a second open end 330 and a leading edge 326, and the input valve 340 attached to the main body 315. An internal conduit 345 is connected to the input valve 340 that is ultimately coupled to the reservoir formed partly by the inner wall 350. The internal conduit 345 is shown as short and straight. The shaft remover 301 also includes a hollow interior 320. The leading edge 325 further includes an optional o-ring seal 316 as described above.

Figure 10:
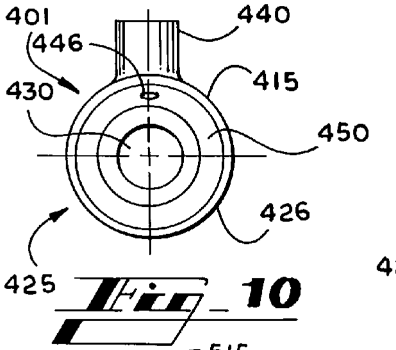
FIG. 10 illustrates a front view of the embodiment of a low impact shaft remover as shown in FIG. 4.

FIG. 10 illustrates a front view of the embodiment of a low impact shaft remover 401 as shown in FIG. 4. The shaft remover 401 includes the main body 415, having an open end 425, a second open end 430 and a leading edge 426, and the input valve 440 attached to the main body 415. The shaft remover 401 also includes a hollow interior 420 and an inner wall 450 that is used to form the reservoir as described above. An opening 446 to the conduit is also shown.

Figure 11:
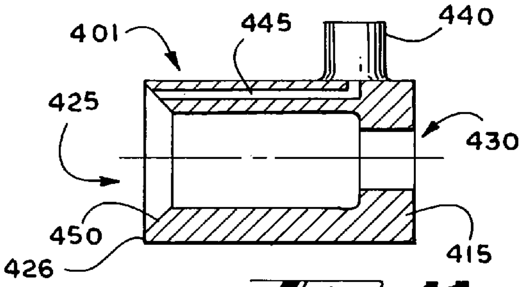
FIG. 11 illustrates a side view of the low impact shaft remover of FIG. 10.

FIG. 11 illustrates a side view of the low impact shaft remover 401 of FIG. 10. The shaft remover 401 includes the main body 415, having an open end 425, a second open end 430 and a leading edge 426, and the input valve 440 attached to the main body 415. An internal conduit 445 is connected to the input valve that is ultimately coupled to the reservoir formed partly by the inner wall 450. The shaft remover 401 also includes a hollow interior 420.

Figure 12:
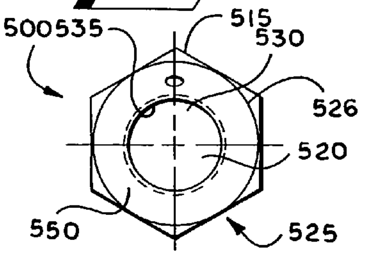
FIG. 12 illustrates a front view of the embodiment of a low impact shaft remover as shown in FIG. 5.

FIG. 12 illustrates a front view of the embodiment of a low impact shaft remover 500 as shown in FIG. 5. The shaft remover 500 includes the main body 515, having an open end 525, a second open end 530, a threaded portion 535 and a leading edge 426, and the input valve 540 attached to the main body 515. The threaded portion 535 is adapted to engage the threaded portion 113 of the shaft 111. The shaft remover 500 also includes a hollow interior 520 and an inner wall 550 that is used to form the reservoir as described above. An opening 546 to the conduit is also shown. As described above with respect to FIG. 5, the main body 515 has a generally hexagonal cross section.

Figure 13:
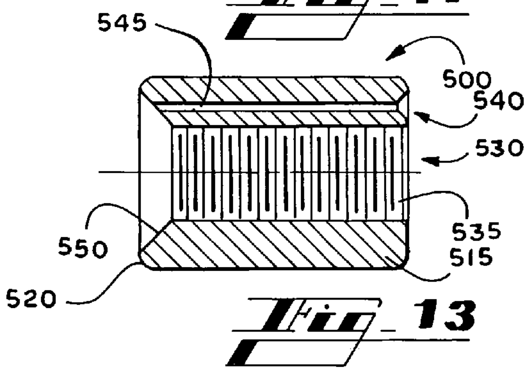
FIG. 13 illustrates a side view of the low impact shaft remover of FIG. 12.

FIG. 13 illustrates a side view of the low impact shaft remover 500 of FIG. 12. The shaft remover 500 includes the main body 515, having an open end 525, a second open end 530, a threaded portion 535 that generally runs the entire length of the main body 515 and a leading edge 526, and the input valve 540 attached to the main body 515. An internal conduit 545 is connected to the input valve 540 that is ultimately coupled to the reservoir formed partly by the inner wall 550. The shaft remover 500 also includes a hollow interior 520.

Figure 14:
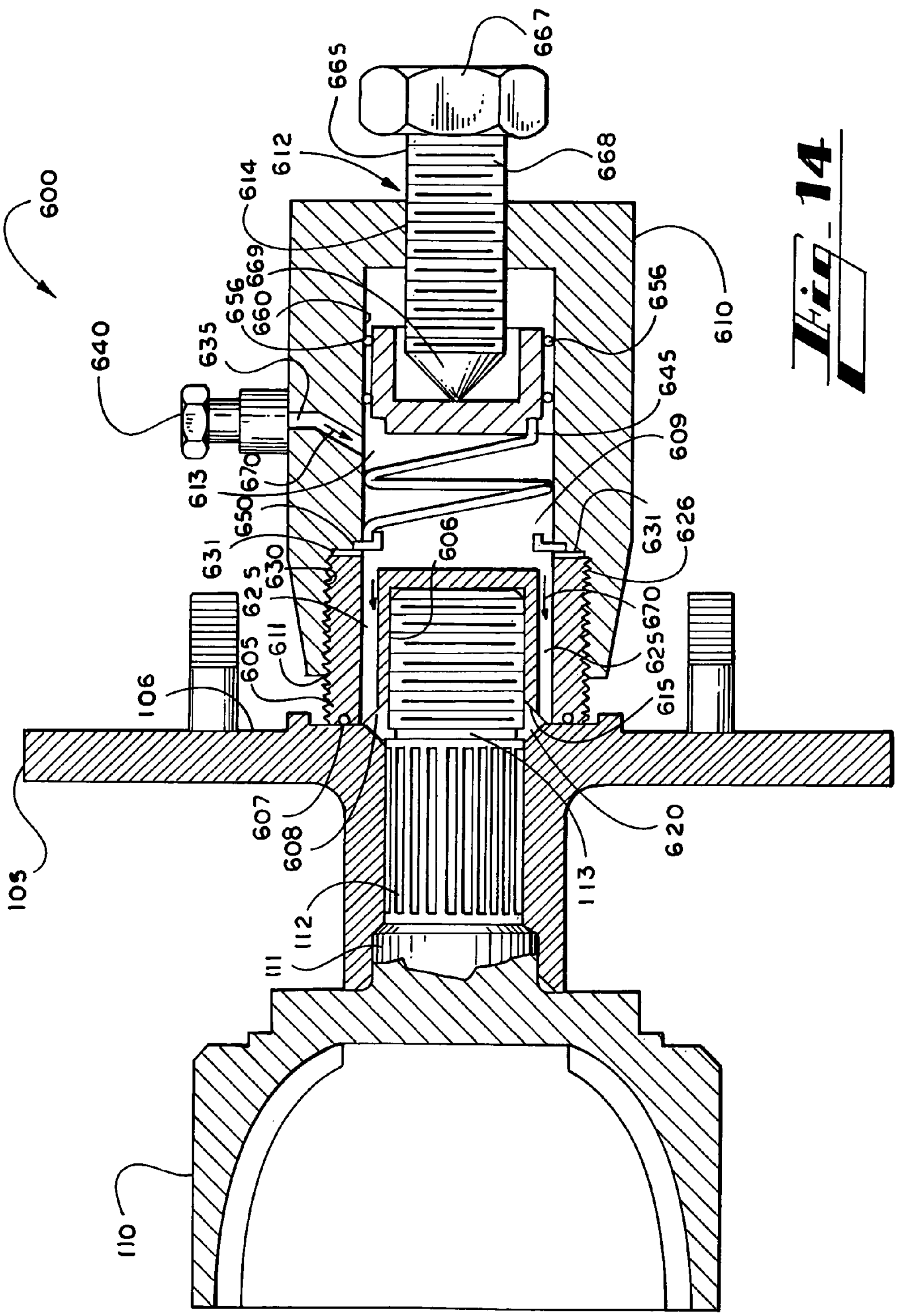
FIG. 14 illustrates another embodiment of a low impact shaft remover system.

FIG. 14 illustrates another embodiment of a low impact shaft remover system 600. The system 600 generally includes an inner body 605 and an outer body 610. The inner body 605, which includes a first open end 608 and a second open end 609, includes an inner threaded portion 606 that is adapted to engage the threaded portion 113 of the shaft 111. The inner body 605 also includes a leading edge 607 adapted to form a seal with the surface 106 of the hub 105. Similar to the embodiments described above, the inner body 605 further includes an inner wall 615 that allows the formation of a reservoir 620 when the leading edge 607 forms a seal with the surface 106 of the hub 105. The inner body 605 also includes one or more internal conduits 625. The inner body 605 generally further includes an outer threaded portion 626.

The outer body 610 includes a first open end 611, a second open end 612 and a hollow interior 613. The outer body 610 generally includes a threaded portion 630 adapted to engage the outer threaded portion 626 of the inner body 605. When the inner and outer bodies 605, 610 are connected, an inner chamber that generally includes the open end 609 of the inner body 605, the open end 611 of the outer body 610 and the hollow interior 613 of the outer body 610. This chamber generally couples with the conduits 625. A seal 631, such as an o-ring seal, is located generally adjacent and around the open end 609 of the inner body 605 and adjacent and around the open end 611 of the outer body to form a better seal when the inner and outer bodies 605, 610 are connected.

The outer body 610 further includes an inner conduit 635 that is coupled to an input valve 640 that is adapted to receive liquids and gases similar to the embodiments described above. The inner conduit 635 is also coupled to the hollow interior 613, and thus the chamber, of the outer body 610. A spring 645 is located within the hollow interior 613 of the outer body 610. The spring 645 is generally attached to a portion of the outer body 110 by retainers 650. A piston 655 is also located within the hollow interior 613 of the outer body 610. The piston 655 is typically in mechanical contact with the spring 645. One or more o-ring type seals 656 are located between the piston 655 and interior surface 660 of the outer body 610. A threaded bolt 665 having a threaded shaft 668, a leading edge 669 and a head 667 is connected to the open end 612 of the outer body 610. The open end 612 typically includes threads 614 to engage with the threaded shaft 668.

During operation, the inner body 605 is typically screwed onto the shaft 111 of the CV joint 110. The outer body 610 is then screwed onto the inner body 605. The piston 655 and spring 645 are generally already located within the outer body 610. The threaded bolt 665 is also typically previously connected to the outer body 610. A suitable fluid as described above can be inserted into the input valve 640. The fluid flows generally in the direction of arrows 670, through the chamber defined by the open ends 609, 611 and the hollow interior 613, through the conduits 625 and ultimately settles in the formed reservoir 620. At this point, gas or fluid pressure could be inserted into the input valve 640, similarly to as described above so that the fluid is pushed into any available spaces between the shaft 111 and the hub 105. However, in a typical implementation, the valve 640 is covered by a cap (not shown). The threaded bolt 665 is turned by applying a torque to the head 667. As the threaded bolt 665 is turned, the leading edge 669 presses on the piston 655. The seals 656 help to keep fluid from leaking around the piston 655 and to maintain pressure in the chamber. As the threaded bolt 665 is turned, the spring 645 compresses within the chamber. Furthermore, as the pressure in the chamber increases, fluid flows along arrows 670 in the conduits 625 and in the reservoir 620 and into available spaces between the shaft 111 and the hub 605, similar to when pressure is added to the input valves in the embodiments described above. When it is determined that sufficient fluid has penetrated between the shaft 111 and the hub 105, pressure can be removed and the shaft remover system 600 can be removed, and the hub 105 can be attempted to be removed from the shaft 111. In general, to remove the system 600, the threaded bolt 665 is screwed out of the outer body 610. In addition, to remove pressure, the cap on the input valve 640 can be removed. As the threaded bolt 665 is screwed out, the spring 645 decompresses, which pushes back on the piston 655, which, in turn, reduces the pressure in the chamber. The outer body 610 can then be unscrewed from the inner body 605 and the inner body 605 can be unscrewed from the shaft 111. If the shaft 111 and the hub 105 are still stuck, the steps discussed above can be repeated as needed.

Figure 15:
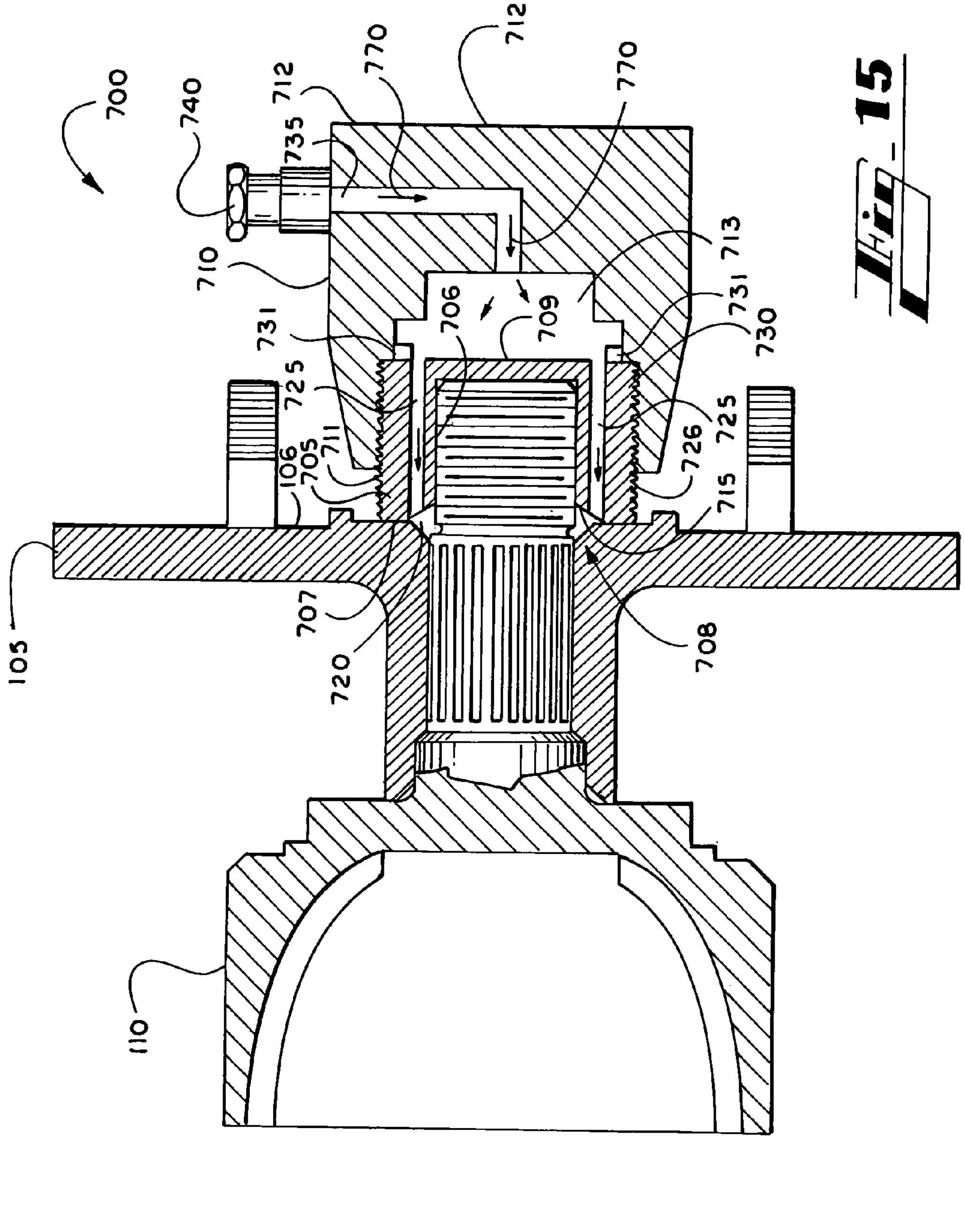
FIG. 15 illustrates another embodiment of a low impact shaft remover system.

FIG. 15 illustrates another embodiment of a low impact shaft remover system 700. The system 700 generally includes an inner body 705 and an outer body 710. The inner body 705, which includes a first open end 708 and a second open end 709, includes an inner threaded portion 706 that is adapted to engage the threaded portion 113 of the shaft 111. The inner body 705 also includes a leading edge 707 adapted to form a seal with the surface 106 of the hub 105. Similar to the embodiments described above, the inner body 705 further includes an inner wall 715 that allows the formation of a reservoir 720 when the leading edge 707 forms a seal with the surface 106 of the hub 105. The inner body 705 also includes one or more internal conduits 725. The inner body 705 generally further includes an outer threaded portion 726.

The outer body 710 includes a first open end 711, a closed end 712 and a hollow interior 713. The outer body 710 generally includes a threaded portion 730 adapted to engage the outer threaded portion 726 of the inner body 705. When the inner and outer bodies 705, 710 are connected, an inner chamber that generally includes the open end 709 of the inner body 705, the open end 711 of the outer body 710 and the hollow interior 713 of the outer body 710. This chamber generally couples with the conduits 725. A seal 731, such as an o-ring seal, is located generally adjacent and around the open end 709 of the inner body 705 and adjacent and around the open end 711 of the outer body to form a better seal when the inner and outer bodies 705, 710 are connected.

The outer body 610 further includes an inner conduit 735 that is coupled to an input valve 740 that is adapted to receive liquids and gases similar to the embodiments described above. The inner conduit 735 is also coupled to the hollow interior 713, and thus the chamber, of the outer body 710.

During operation, the inner body 705 is typically screwed onto the shaft 111 of the CV joint 110. The outer body 710 is then screwed onto the inner body 705. A suitable fluid as described above can be inserted into the input valve 740. The fluid flows generally in the direction of arrows 770, through the chamber defined by the open ends 709, 711 and the hollow interior 713, through the conduits 725 and ultimately settles in the formed reservoir 720. Gas or fluid pressure is inserted into the input valve 740, similarly to as described above so that the fluid is pushed into any available spaces between the shaft 111 and the hub 105. As the pressure in the chamber increases, fluid flows along arrows 770 in the conduits 725 and in the reservoir 720 and into available spaces between the shaft 111 and the hub 705, similar to when pressure is added to the input valves in the embodiments described above. When it is determined that sufficient fluid has pushed between the shaft 111 and the hub 105, pressure can be removed and the shaft remover system 700 can be removed, and the hub 105 can be attempted to be removed from the shaft 111. In general, to remove the system 700, the outer body 710 can be unscrewed from the inner body 705 and the inner body 705 can be unscrewed from the shaft 111. In another implementation, the outer body 710 can be temporarily locked to the inner body 705 by a set screw or other suitable device. This locked state allows installation and removal of the tool as a single unit. If the shaft 111 and the hub 105 are still stuck, the steps discussed above can be repeated as needed.

The embodiments described herein are specific to a CV joint and hub system. However, it is understood that the embodiments described herein are not limited to use in only a CV joint and hub system. There are various other shaft and attachment systems that can benefit from the use of the embodiments of the low impact shaft remover. For example, other system can include but are not limited to a steering wheel and column, a boat propeller from its output shaft, a crankshaft pulley from the crankshaft, a pitman arm from a steering box, bolts and studs from equipment, spacers or bushings and any drive gear from its motor and attachment.

The internal conduits have generally been shown as "L" shaped and run along the one side of the hollow interior. It is understood that in other embodiments the internal conduit can run along any suitable portion of the main bodies of the shaft removers.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A shaft remover apparatus, comprising:

a main body having an open end having a leading edge, a second end and a hollow interior;

a conduit located within a portion of the main body;

an input valve connected to the main body and coupled to the conduit;

an inner wall angled from the leading edge toward the hollow interior, wherein the conduit opens on the inner wall; and threads located on a portion of the open end.

2. The apparatus as claimed in claim 1, wherein the second end is closed.

3. The apparatus as claimed in claim 1 wherein the second end is open.

4. The apparatus as claimed in claim 1 further comprising a seal connected to the leading edge.

5. The apparatus as claimed in claim 1 wherein the main body has a cylindrical cross section.

6. The apparatus as claimed in claim 1 wherein the main body has a hexagonal cross section.

7. A system for removing a shaft from a shaft attachment, comprising:

a shaft remover apparatus, including:

a main body having an open end having a leading edge, a second end and a hollow interior;

a conduit located within a portion of the main body;

an input valve connected to the main body and coupled to the conduit; and an inner wall angled from the leading edge toward the hollow interior, wherein the conduit opens on the inner wall; and means to connect the shaft remover apparatus to the attachment.

8. The system as claimed in claim 7, wherein the attachment is a hub and the shaft is a constant velocity joint shaft.

9. The system as claimed in claim 8 wherein the second end is closed and the means to connect the shaft remover apparatus to the hub is a hub puller.

10. The system as claimed in claim 8 wherein the second end is open and the means to connect the shaft remover apparatus to the hub is a shaft nut.

11. A system for removing a shaft from a shaft attachment, comprising:

an inner body having a first open end having a leading edge, a second open end, a hollow interior, inner threads located on an internal surface of the inner body and outer threads located on an external surface of the inner body;

an outer body having a first open end, a second end, a hollow interior and inner threads located on an internal surface of the outer body, wherein the outer threads of the inner body are in threaded engagement with the inner threads of the outer body;

an inner chamber including the second open end of the inner body, the first open end of the outer body and the hollow interior of the outer body;

an input valve connected to the outer body;

an inner conduit located within the outer body, connected to the input valve and coupled to the chamber;

a conduit located within the inner body, the conduits being coupled to the chamber; and an inner wall angled from the leading edge toward the hollow interior, wherein the inner body conduit opens on the inner wall.

12. The system as claimed in claim 11 wherein the second end is open.

13. The system as claimed in claim 12 further comprising:

a piston located within the chamber;

a spring in mechanical contact with the piston; and a threaded bolt in threaded engagement with the second open end and in mechanical contact with the piston.

14. A system for removing a shaft attachment from a shaft, comprising:

a main body having an open end having a leading edge in mechanical contact with a surface of the attachment, thereby forming a reservoir, a second end and a hollow interior;

a conduit located within a portion of the main body;

an input valve connected to the main body and coupled to the conduit; and an inner wall angled from the leading edge toward the hollow interior, wherein the conduit opens on the inner wall.

15. The system as claimed in claim 14 further comprising inner threads on an internal surface of the main body, the inner threads being in threaded engagement with threads on the shaft.

16. The system as claimed in claim 14 further comprising a shaft remover connector connected to the main body and to the attachment.

17. A shaft remover apparatus, comprising:

a main body having an open end and a conduit within a portion of the main body;

an input valve connected to the main body and coupled to the conduit; and means to form a reservoir adjacent a leading edge of the main body, wherein the conduit opens into the reservoir.

18. The apparatus as claimed in claim 17 wherein the reservoir is formed by a recessed portion of the open end.

* * * * *